(12) United States Patent
Böhringer

(10) Patent No.: US 6,733,216 B2
(45) Date of Patent: May 11, 2004

(54) HAND-HELD MILLING MACHINE

(75) Inventor: Claus Böhringer, Igis (CH)

(73) Assignee: Trumpf Grusch AG, Grusch (CH)

( * ) Notice: Subject to any disclaimer, the term of this patent is extended or adjusted under 35 U.S.C. 154(b) by 9 days.

(21) Appl. No.: 10/376,928

(22) Filed: Feb. 28, 2003

(65) Prior Publication Data

US 2003/0165367 A1 Sep. 4, 2003

(30) Foreign Application Priority Data

Mar. 2, 2002 (DE) ..................................... 202 03 390 U

(51) Int. Cl.[7] ................................................. B23C 1/20
(52) U.S. Cl. ....................... 409/138; 409/185; 409/210; 409/214; 144/136.95
(58) Field of Search ................................ 409/138, 180, 409/185, 210, 214; 144/136.95, 154.5; 408/241 S

(56) References Cited

U.S. PATENT DOCUMENTS

| 1,514,894 A | | 11/1924 | Carter |
| 3,489,191 A | * | 1/1970 | Blevins ................... 144/134.1 |
| 4,946,323 A | | 8/1990 | Kazama et al. |
| 4,964,765 A | * | 10/1990 | Kishi ......................... 409/181 |
| 5,088,865 A | * | 2/1992 | Beth et al. ................... 409/182 |
| 5,613,813 A | * | 3/1997 | Winchester et al. ........ 409/182 |
| 5,853,274 A | * | 12/1998 | Coffey et al. ............... 409/182 |
| 6,042,311 A | * | 3/2000 | Yokoyama et al. ......... 409/138 |

FOREIGN PATENT DOCUMENTS

| DE | 196 37 690 A | 3/1997 |
| GB | 677908 | 8/1952 |
| WO | WO 92/15419 | 9/1992 |

* cited by examiner

*Primary Examiner*—Erica Cadugan
*Assistant Examiner*—Dana Ross

(57) ABSTRACT

A hand-held milling machine (1) has a cutting tool (9, 10) which protrudes from a machine support (3) on the side facing the workpiece. A screw-type clamping mechanism allows the cutting tool (9, 10) and the machine support (3) to be positionally adjusted relative to each other by the relative rotational movement of clamping sections (6, 18) on both sides around a drive axis (13) in the direction of the projection of the cutting tool (9, 10) relative to the machine support (3). The clamping sections (6, 18) are positioned opposite each other in the radial direction of the drive axis (13). A tensioning device (35) allows the two clamping sections (6, 18) on both sides to be secured against relative rotational movement around the drive axis (13).

The tensioning device (35) includes an annular tensioning element which is at least in part positioned radially outside the outer clamping section (18) and which, by means of an actuating element, can be tensioned and released in the circumferential direction, so that, when the tensioning element is tightened into the clamping position, the outer clamping section (18) can be brought into contact with the inner clamping section (6).

7 Claims, 5 Drawing Sheets

HAND-HELD MILLING MACHINE

BACKGROUND OF THE INVENTION

This invention relates to a hand-held milling machine for the processing of workpieces and especially for the trimming of workpiece edges and, incorporating at least one power-driven rotary milling tool, a machine support plate relative to which the milling tool protrudes on the side facing the workpiece and by which the hand-held milling machine can rest on the workpiece. A screw-type clamping mechanism having one clamping section is respectively associated with the milling tool and the support plate, and it features at least one actuating element. The milling tool and the support plate move relative to each other through relative rotational movement of the clamping sections on either side around a drive spindle axis in the direction in which the milling tool protrudes relative to the support plate. The clamping sections on either side are located opposite each other in a radial direction relative to the drive spindle axis. A releasable tensioning device tightens the clamps in the radial direction of the drive spindle axis and the radially inward (inner) clamping section can be brought into contact with the radially outward (outer) clamping section, allowing the two clamping sections on either side to be secured against any relative rotational movement around the drive spindle axis.

The screw-type clamping mechanism serves to define the depth of penetration of the milling tool in the workpiece being processed. In the case of edge cutting machines that are used for chamfering workpiece edges and therefore employ cutting tools whose cutting edges are angled relative to the tool drive axis, the degree of the chamfer on the workpiece edge varies as a function of the depth of penetration of the milling tool.

A hand-held milling machine of this general type has been described in U.S. Pat. No. 1,514,894. In the prior art design, a milling tool is positioned on a motor housing that doubles as part of a screw-type clamping mechanism and is therefore provided with an outside thread. That outside thread on the motor housing engages with a female (i.e., inside) thread on a hollow cylindrical machine support. Relative rotational movement of the motor housing and the machine support permits the variation of the projection of the milling tool on the workpiece side relative to the machine support and thus the depth of penetration of the milling tool on the workpiece being processed. For locking the components in a selected setting, the wall of the hollow cylindrical machine support is slotted in the axial direction of the hollow cylinder and provided on both sides of the slot with radially protruding flanges. A clamping screw extends through both flanges.

Tightening the clamping screw by turning it causes the flanges and thus the edges of the slot on the machine support to be drawn together to a point where the inside thread of the machine support and the outside thread of the motor housing are frictionally engaged, essentially blocking any unintentional rotational movement of the machine support relative to the motor housing. The friction lock between the motor housing and the machine support is released by loosening the clamping screw and turning it in the opposite direction. In the process the hollow cylindrical machine support expands to a degree. If the clamping screw is loosened too much, causing a correspondingly excessive spreading of the machine support, the result may be an unintentional disengagement of the inside thread of the machine support from the outside thread of the motor housing.

It is an object of this invention to provide a novel hand-held milling machine which provides improved functional reliability.

Another object is to provide such a milling machine which is readily manipulatable.

SUMMARY OF THE INVENTION

It has now been found that the foregoing and related objects may be readily attained in a hand-held milling machine for the processing of workpieces and especially for the trimming of workpiece edges including at least one power driven rotary cutting tool and a machine support relative to which the cutting tool protrudes on the side facing an associated workpiece. The support serves to support the hand-held milling machine on the associated workpiece being processed. A screw-type clamping mechanism having one clamping section associated with the cutting tool and the machine support has at least one actuating element serving to move the cutting tool and the machine support relative to each other through relative rotary movement of the clamping sections on each side around a drive spindle axis, in the direction of projection of the cutting tool relative to the machine support. The clamping sections on the two sides being positioned opposite each other in a radial direction relative to the drive axis A releasable tensioning device acts in a radial direction relative to the drive axis whereby the radially inward (inner) clamping section can be brought into contact with the radially outward clamping section, allowing the two clamping sections on both sides to be secured against any relative rotational movement around the drive axis. The tensioning device includes an annular tensioning element that is at least in part radially positioned outside the outer clamping section. An actuating device is operable to tighten and loosen the tensioning element in the circumferential directions, whereby tightening of the tensioning element can bring the outer clamping section into contact with the inner clamping section.

Desirably, the tensioning element is in the form of a smooth walled tensioning ring, tensioning strap or similar element, and the actuating device employed is a manual actuating lever. The tensioning element is mounted directly on the outer clamping section and the outer clamping section is provided with at least one recessed seat for receiving the tensioning element.

Preferably, the clamping section associated with the cutting tool constitutes the inner clamping section on a machine base unit and the clamping section associated with the machine support constitutes the outer clamping section. When the tensioning device is in the unclamped state, the tensioning element and/or the actuating device is/are rotationally locked on the machine base unit in the direction of relative rotational movement of the clamping sections on the two sides while the tensioning element and the outer clamping section can be rotated relative to each other in the direction of the relative rotational movement.

The tensioning element can be tensioned by radially protruding clamping flanges which are positioned opposite each other in the circumferential direction with a gap between them, and an anti-rotation lock is provided on the machine base unit for the tensioning element and/or the actuating device, the anti-rotation lock engaging in the gap between the clamping flanges.

Desirably, the anti-rotation lock for the annular tensioning element is in the form of an anti-rotation lock pin.

As can be seen, the milling machine of the present invention enables the clamping sections of the screw-type clamping mechanism and the tensioning device to be physically separated. Accordingly, the clamping sections and the tensioning device can be operated and manipulated without necessarily affecting the respective other component of the hand-held milling machine.

The machine has a simple tensioning device and the functional reliability of the tensioning device is assured by locating the tensioning element on the outer clamping section.

The preferred design version of the machine provides for mutual physical association between the base unit of the machine and the clamping element, i.e., the actuating element of the tensioning device which is independent of the rotational position of the clamping section associated with the machine support plate relative to the clamping section that is associated with the milling tool. Consequently, regardless of the mutual setting between the milling tool and the machine support plate, the tensioning device can occupy a position that ensures its functional reliability and/or user-friendly operation.

The machine provides anti-rotation locking devices for the clamping element, i.e., actuating element of the tensioning device that can be implemented on hand-held milling machines.

DETAILED DESCRIPTION OF THE ILLUSTRATED EMBODIMENT

Figure 1:
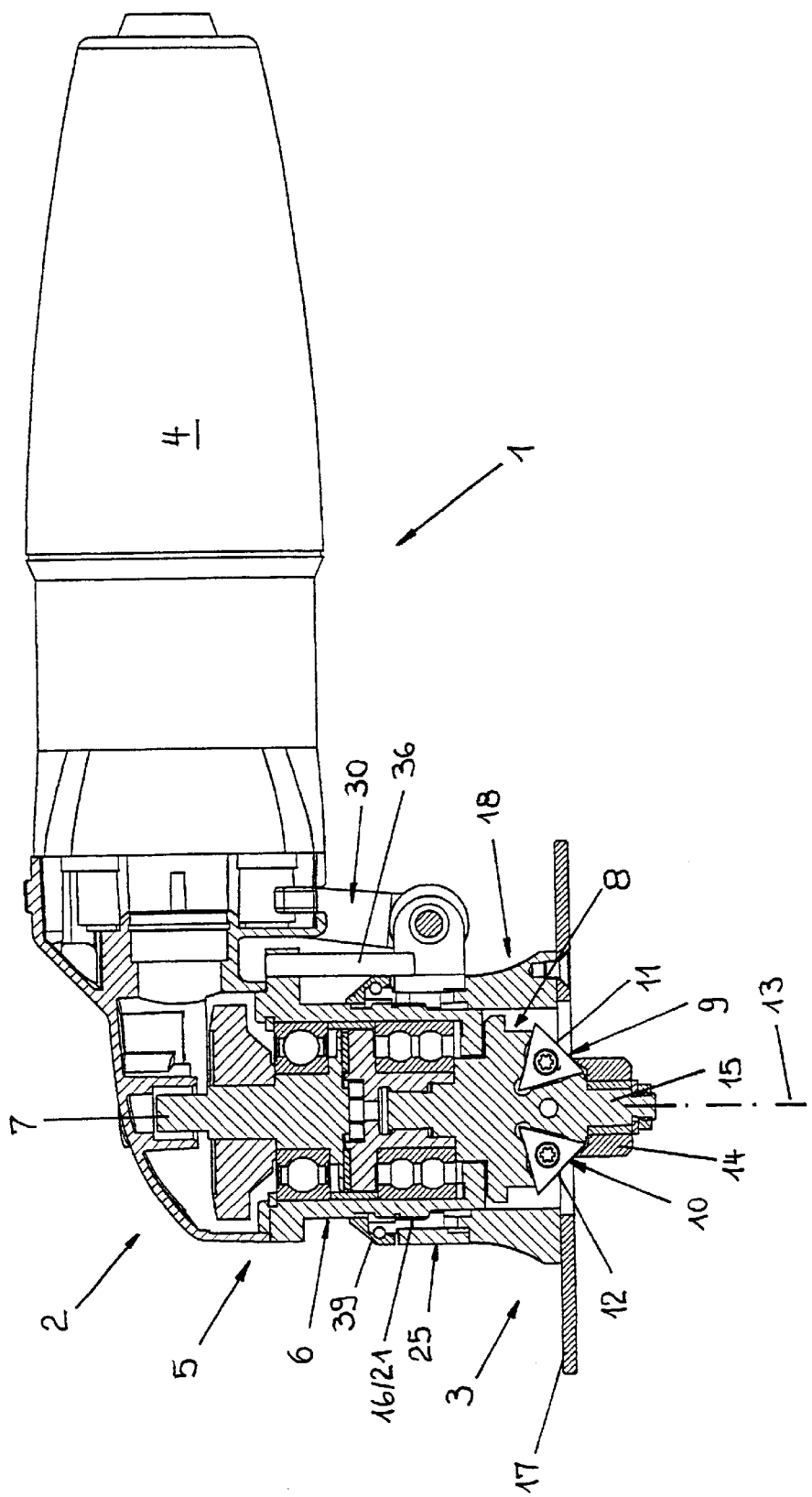
FIG. 1 shows a hand-held milling machine embodying the present invention in partial cross-section to show the milling tool and the machine support.
Figure 2:
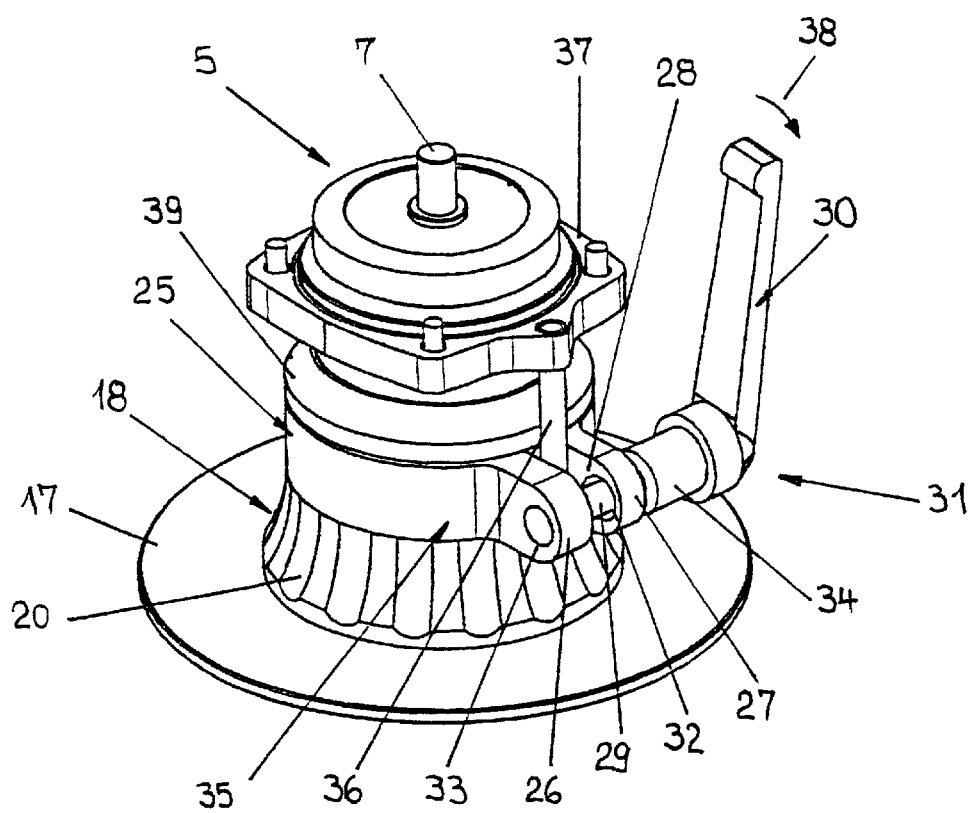
FIG. 2 is a perspective view of the part of the milling machine of FIG. 1 facing the workpiece.
Figure 3:
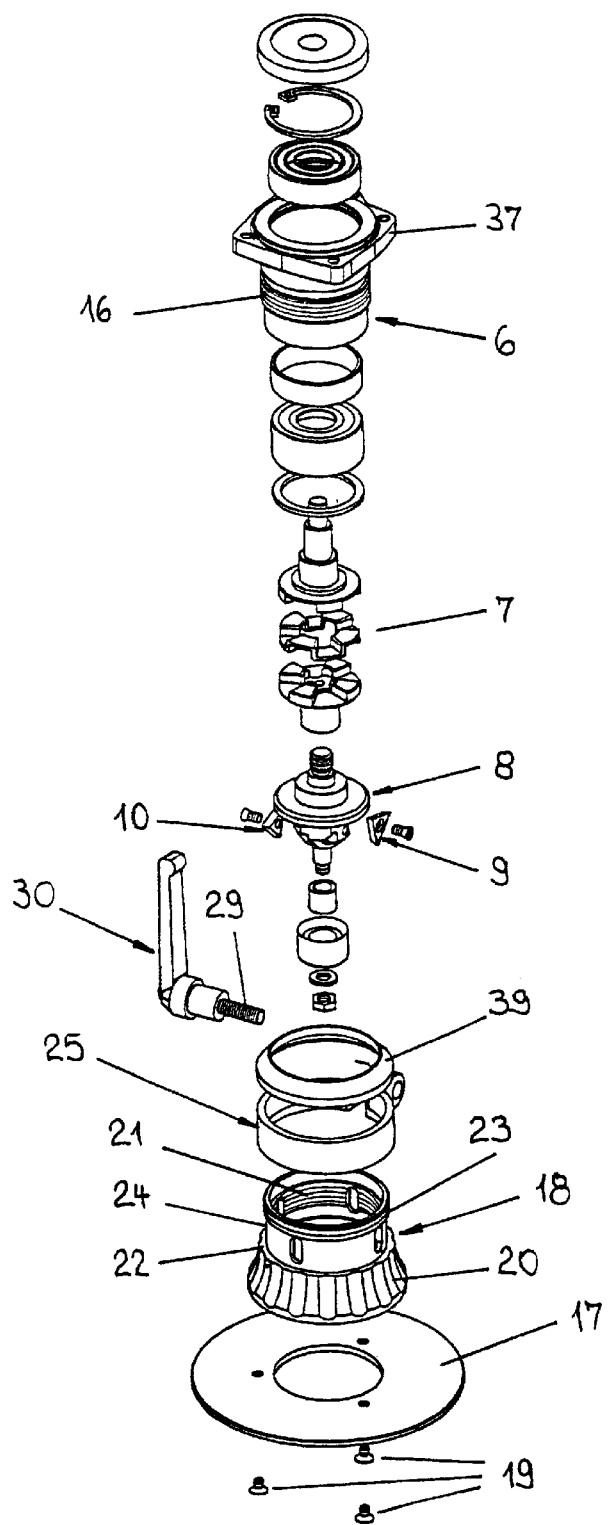
FIG. 3 is an exploded view of the machine part of FIG. 2.

As shown in FIGS. 1 to 3, a hand-held milling machine in the form of a chamfering (i.e., edge-cutting) machine 1 includes a machine base unit 2 and a machine support 3.

The machine base unit 2 is composed of a motor housing 4 accommodating an electric drive motor and, a tool assembly 5 is supported on a flange on the motor housing 4 on the workpiece side. The latter encompasses a bearing box 6 that houses a power rotatable multi-segmented shaft 7 serving to drive the tool holder 8. The tool holder 8 holds two milling tools in the form of cutting bits 9, 10. The cutting edges 11, 12 of the cutting bits 9, 10 extend at an angle relative to the rotary drive axis 13 of the cutting tools 9, 10, i.e., of the shaft 7. A support roller 14 is rotatably mounted around the drive spindle axis 13 on a stepped trunnion 15 extending from the tool holder 8 on the far side of the bearing box 6. The outside surface of the bearing box 6 is provided with an outside thread 16.

The machine support 3 is composed of an annular support plate 17 and a retaining sleeve 18 is mounted on the plate 16 by screws. Relative to the support plate 17, the cutting bits 9, 10 protrude on the side facing the workpiece in the direction of the drive axis 13.

The axial section of the retaining sleeve 18 adjacent the support plate 17 is enlarged for accepting mounting screws 19 and it has a knurled outer surface 20. The opposite end of the retaining sleeve 18 is slotted in the axial direction and is provided with an inside thread 21. A shoulder 22 located in the transitional area between the two axial sections of the retaining sleeve 18 and, in combination with a terminal outer collar 23, provides a groove-like recessed seat 24.

The recessed seat 24 serves to hold in place an open, smooth walled tensioning ring 25 whose ends are shaped to constitute clamping flanges 26, 27 that are angled outwardly in a radial direction and face each other with a gap 28 between them as best seen in FIG. 2. A threaded bolt 29 extends through the clamping flanges 26, 27. The bolt 29 and a manual lever 30 are components of a clamping unit 31 that serves to tighten and loosen the tensioning ring 25. To that effect, the threaded bolt 29 extends through a plain, unthreaded bore 32 in the clamping flange 27 and then engages with its outside thread in the inside thread of a threaded bore 33 in the clamping flange 26. On its side facing the manual lever 30, the threaded bolt 29 abuts a neck section 34 of the manual lever 30, and the neck section 34 has a larger diameter than the plain bore 32 in the clamping flange 27. Together with the tensioning ring 25, the clamping unit 31 constitutes a tensioning device 35. An anti-rotation pin 36 is seated in a flange 37 on the bearing box 6 and protrudes into the gap 28 between the clamping flanges 26, 27. A graduated ring 39 with an annular scale (not illustrated) is mounted above the outer collar 23 on the retaining sleeve 18.

The bearing box 6 and the retaining sleeve 18 constitute functional components of a screw-type clamping mechanism by which the machine support 3 and the cutting bits 9, 10 can be selectively adjusted relative to each other along the axis of the clamping drive spindle that coincides with the drive axis 13.

The relative setting between the milling tools, i.e., cutting bits 9, 10, and the machine support 3 can be locked by the tensioning device 35 in the operating state illustrated in FIG. 2 where the manual actuating lever 30 is in the tensioning position.

An appropriate position of the manual actuating lever 30 will tighten the tensioning ring 25. This causes the tensioning ring 25 to apply radially inward pressure on the axial end section of the retaining sleeve 18 which has an inside thread 21. The force exerted by the tensioning device 35 causes the section of the retaining sleeve 18 that is acted upon by the tensioning ring 25 to be pressed against the bearing box 6 radially positioned within the retaining sleeve 18. The result is a frictional lock between the outside thread 16 of the bearing box 6 and the inside thread 21 of the retaining sleeve 18, preventing the bearing box 6 from rotating relative to the retaining sleeve 18 around the axis of the clamping drive spindle, i.e., the drive axis 13.

For changing the relative position between the cutting bits 9, 10 and the machine support 3, the manual actuating lever 30 is moved from its clamping position as depicted in FIG. 2 in the direction of the arrow 38. Tilting the manual lever 30 in this fashion loosens the tensioning ring 25, thus releasing the friction lock between the bearing box 6 and the retaining sleeve 18. It is now possible to rotate the retaining sleeve 18 and with it the support plate 17 relative to the bearing box 6 and thus the machine base unit 2 that holds the cutting tools 9, 10.

Depending on the direction in which the retaining sleeve 18 is turned, the support plate 17 will move up or down relative to the cutting tools 9, 10 shown in FIGS. 1 to 3, thus increasing or decreasing the distance by which the cutting tools 9, 10 protrude on the workpiece side relative to the support plate 17. The distance by which the cutting tools 9, 10 project on the workpiece side relative to the support plate 17 can be read on the scale on the graduated collar 39 which rotates in unison with the retaining sleeve 18. Associated with the graduated scale is a pointer that is attached to the base unit 2 of the machine.

The tensioning ring 25, i.e., the entire tensioning device 35, is prevented from rotating along with the retaining sleeve 18 by the anti-rotation pin 36. It follows that, as the setting between the cutting tools 9, 10 and the machine support 3 is changed, the position of the tensioning device 35 relative to the machine base unit 2 will remain unchanged. As an important feature, the manual actuating lever 30 will always be positioned on the side next to the machine base unit 2 so that, in any state of relative rotation between the retaining sleeve 18 and the bearing box 6, the operator of the machine has access to it and can tilt it into its vertical locking position. To secure a selected setting, the manual actuating lever 30 is moved in a direction opposite the arrow 38 from its horizontal into a vertical position which restores the state depicted in FIG. 2.

As a result of the readjustment, the distance by which the cutting tools 9, 10 protrude on the workpiece side relative to the support plate 17 has been changed. That in turn changes the magnitude of the chamfer produced on the edge of a workpiece by the cutting tools 9, 10. The farther the cutting tools 9, 10 protrude on the workpiece side of the support plate 17, the deeper the chamfer will be.

Figure 4:
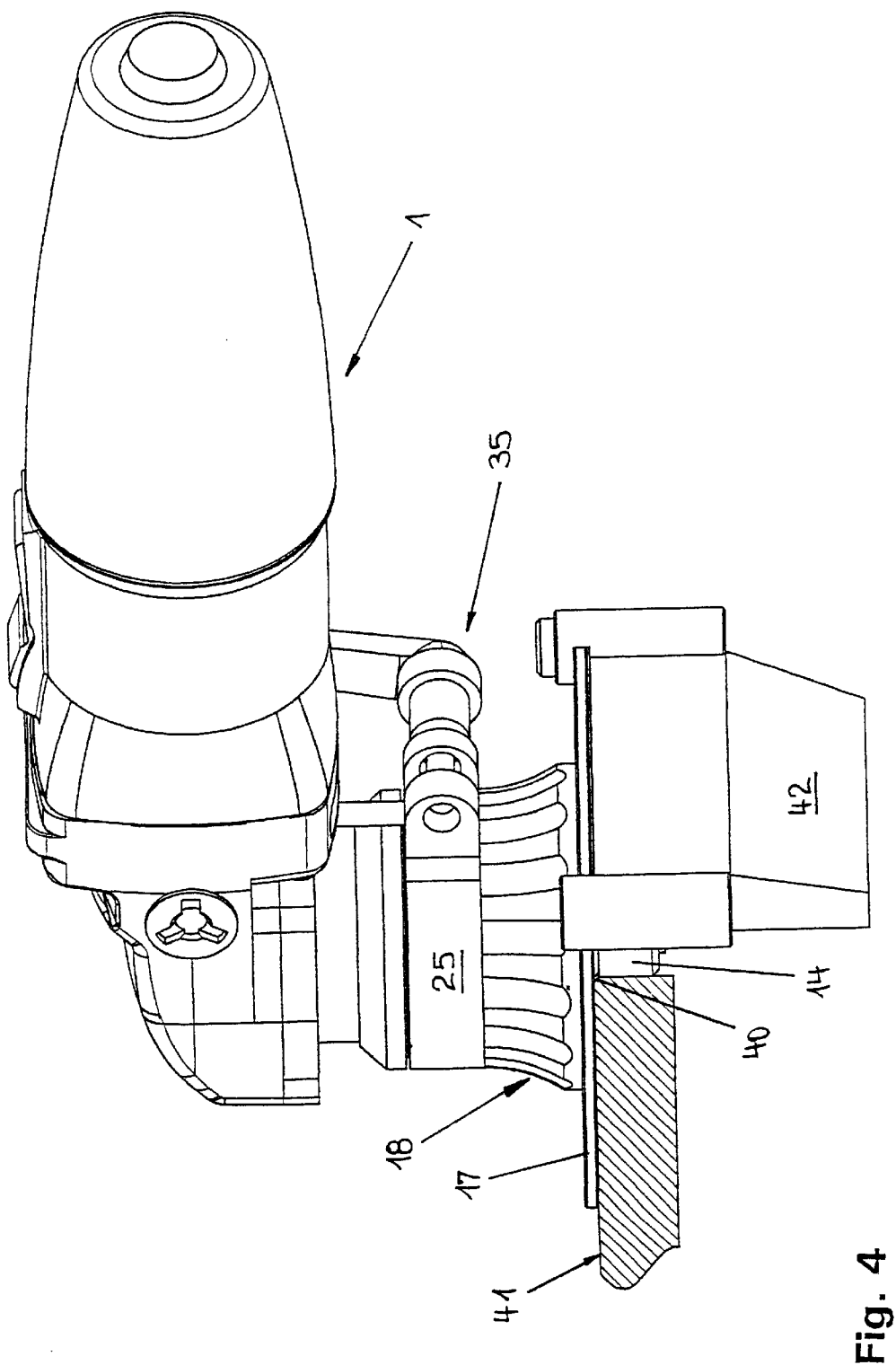
FIG. 4 is a side view of the hand-held milling machine or FIGS. 1 to 3 in a workpiece processing position.
Figure 5:
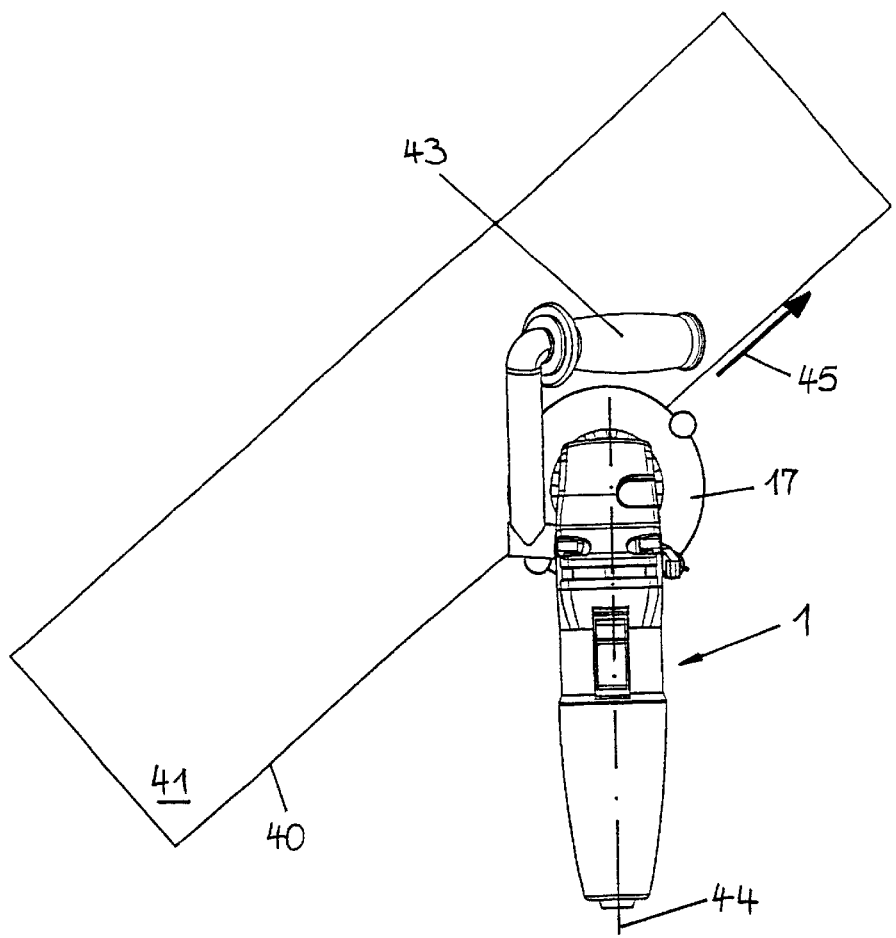
FIG. 5 is a top view of the hand-held milling machine and workpiece of FIG. 4.

Once the cutting tools 9, 10 have been adjusted relative to the machine support 3 and that setting has been locked, the edge cutter 1 can be moved, in the manner shown in FIGS. 4 and 5, along the edge 40 of a workpiece 41, which is shown as a metal plate. On the top surface of the workpiece 41, the edge cutter 1 is guided by the support plate 17, and, on the workpiece bottom surface by the support roller 14. FIG. 4 also shows on the operator side a chip catcher 42 that serves to collect the chips machined from the workpiece 41 by the cutting tools 9, 10.

As shown in FIG. 5, a handle 43 is attached to the machine base unit 2. For ergonomic considerations, the handle 43 is set at an angle relative to the longitudinal axis 44 of the machine. The arrow 45 in FIG. 5 indicates the direction of travel of the edge cutter 1 along the edge 40 of the workpiece 41.

Thus, it can be seen from the foregoing detailed specification and attached drawings that the hand-held milling machine of the present machine can be readily adjusted to provide the desired chamfer on the edge of a workpiece.

Having thus described the invention, what is claimed is:

1. In a hand-held milling machine for the processing of workpieces (41) and especially for the trimming of workpiece edges (40), including
    (a) at least one power driven rotary cutting tool (9, 10);
    (b) a machine support (3) relative to which the cutting tool (9, 10) protrudes on the side facing an associated workpiece, said support (3) serving to support the hand-held milling machine on the associated workpiece (41) being processed;
    (c) a screw-type clamping mechanism having one clamping section (6, 18) associated with the cutting tool (9, 10) and the machine support (3), said clamping mechanism having at least one actuating element (16, 21) serving to move the cutting tool (9, 10) and the machine support (3) relative to each other through a relative rotary movement of the clamping sections (6, 18) on each side around a drive spindle axis (13), in the direction of projection of the cutting tool (9, 10) relative to the machine support (3), said clamping sections (6, 18) on the two sides being positioned opposite each other in a radial direction relative to the drive axis (13);
    (d) a releasable tensioning device (35) acting in a radial direction relative to the drive axis (13) whereby the radially inward (inner) clamping section (6) can be brought into contact with the radially outward clamping section (18), allowing the two clamping sections (6, 18) on both sides to be secured against any relative rotational movement around the drive axis (13), the tensioning device (35) including an annular tensioning element that is at least in part radially positioned outside the outer clamping section (18); and
    (e) an actuating device operable to tighten and loosen the tensioning element in the circumferential directions, whereby tightening of the tensioning element can bring the outer clamping section (18) into contact with the inner clamping section (6).

2. A hand-held milling machine in accordance with claim 1, wherein the tensioning element is in the form of a smooth walled tensioning ring (25), tensioning strap or similar element.

3. A hand-held milling machine in accordance with claim 1 wherein the actuating device employed is a manual actuating lever (30).

4. A hand-held milling machine in accordance with claim 1 wherein in the tensioning element is mounted directly on the outer clamping section (18) and the outer clamping section (18) is provided with at least one recessed seat (24) for receiving the tensioning element.

5. A hand-held milling machine in accordance with claim 1 wherein the clamping section (6) associated with the cutting tool (9, 10) constitutes the inner clamping section (6) on a machine base unit (2) and the clamping section (18) associated with the machine support (3) constitutes the outer clamping section (18), wherein when the tensioning device (35) is in the unclamped state, the tensioning element and/or the actuating device is/are rotationally locked on the machine base unit (2) in the direction of relative rotational movement of the clamping sections (6, 18) on the two sides while the tensioning element and the outer clamping section (18) can be rotated relative to each other in the direction of the said relative rotational movement.

6. A hand-held milling machine in accordance with claim 1 wherein the tensioning element can be tensioned by radially protruding clamping flanges (26, 27) which are positioned opposite each other in the circumferential direction with a gap (28) between them, and wherein an anti-rotation lock is provided on the machine base unit (2) for the tensioning element and/or the actuating device, the anti-rotation lock engaging in the gap (28) between the clamping flanges (26, 27).

7. A hand-held milling machine in accordance with claim 6 wherein the anti-rotation lock for the annular tensioning element is in the form of an anti-rotation lock pin (36).

* * * * *